(12) United States Patent
Johnson

(10) Patent No.: US 7,441,888 B1
(45) Date of Patent: Oct. 28, 2008

(54) EYEGLASS FRAME

(75) Inventor: A. David Johnson, San Leandro, CA (US)

(73) Assignee: TiNi Alloy Company, San Leandro, CA (US)

( * ) Notice: Subject to any disclaimer, the term of this patent is extended or adjusted under 35 U.S.C. 154(b) by 31 days.

(21) Appl. No.: 11/415,885

(22) Filed: May 2, 2006

Related U.S. Application Data

(60) Provisional application No. 60/678,921, filed on May 9, 2005.

(51) Int. Cl.
*G02C 1/00* (2006.01)

(52) U.S. Cl. ............................................. 351/41

(58) Field of Classification Search ........... 351/111, 351/153, 41; 16/228
See application file for complete search history.

(56) References Cited

U.S. PATENT DOCUMENTS

| | | |
|---|---|---|
| 1,926,925 A | 9/1933 | Wescott |
| 2,060,593 A | 11/1936 | Schaurte et al. |
| 2,371,614 A | 3/1945 | Graves |
| 2,608,996 A | 9/1952 | Forman |
| 2,610,300 A | 9/1952 | Walton et al. |
| 2,647,017 A | 7/1953 | Coulliette |
| 2,911,504 A | 11/1959 | Cohn |
| 3,229,956 A | 1/1966 | White |
| 3,351,463 A | 11/1967 | Rozner et al. |
| 3,400,906 A | 9/1968 | Stocklin |
| 3,408,890 A | 11/1968 | Bochman, Jr. |
| 3,445,086 A | 5/1969 | Quinn |
| 3,454,286 A | 7/1969 | Anderson et al. |
| 3,546,996 A | 12/1970 | Grijalva et al. |
| 3,613,732 A | 10/1971 | Willson et al. |
| 3,620,212 A | 11/1971 | Fannon, Jr. et al. |
| 3,659,625 A | 5/1972 | Coiner et al. |
| 3,725,835 A | 4/1973 | Hopkins et al. |
| 3,849,756 A | 11/1974 | Hickling |
| 3,918,443 A | 11/1975 | Vennard et al. |
| 3,974,844 A | 8/1976 | Pimentel |
| 4,055,955 A | 11/1977 | Johnson |
| 4,063,831 A | 12/1977 | Meuret |
| 4,072,159 A | 2/1978 | Kurosawa |
| 4,096,993 A | 6/1978 | Behr |

(Continued)

FOREIGN PATENT DOCUMENTS

EP 0053596 6/1982

(Continued)

OTHER PUBLICATIONS

Johnson, David et al.; U.S. Appl. No. 12/019,553 entitled "Frangible shape memory alloy fire sprinkler valve actuator," filed Jan. 24, 2008.

(Continued)

*Primary Examiner*—Hung X Dang
(74) *Attorney, Agent, or Firm*—Shay Glenn LLP

(57) ABSTRACT

Eyeglass frame hinges are replaced by flexures made of hyperelastic single-crystal shape memory alloy. These flexures exhibit more than 8 percent recoverable strain. Eyeglass frames with these flexures can be distorted repeatedly in ways that would destroy ordinary hinges, and recover without damage. Flexures may be incorporated in eyeglass frames in ways that make them attractive as fashion items, thus enhancing the value of a commodity consumer product.

5 Claims, 3 Drawing Sheets

U.S. PATENT DOCUMENTS

| | | |
|---|---|---|
| 4,176,719 A | 12/1979 | Bray |
| 4,177,327 A | 12/1979 | Mathews |
| 4,243,963 A | 1/1981 | Jameel et al. |
| 4,340,049 A | 7/1982 | Munsch |
| 4,485,545 A | 12/1984 | Caverly |
| 4,501,058 A | 2/1985 | Schutzler |
| 4,524,343 A | 6/1985 | Morgan et al. |
| 4,549,717 A | 10/1985 | Dewaegheneire |
| 4,551,974 A | 11/1985 | Yaeger et al. |
| 4,553,393 A | 11/1985 | Ruoff |
| 4,558,715 A | 12/1985 | Walton et al. |
| 4,567,549 A | 1/1986 | Lemme |
| 4,585,209 A | 4/1986 | Aine et al. |
| 4,596,483 A | 6/1986 | Gabriel et al. |
| 4,619,284 A | 10/1986 | Delarue et al. |
| 4,654,191 A | 3/1987 | Krieg |
| 4,684,913 A | 8/1987 | Yaeger |
| 4,706,758 A | 11/1987 | Johnson |
| 4,753,465 A | 6/1988 | Dalby |
| 4,821,997 A | 4/1989 | Zdeblick |
| 4,823,607 A | 4/1989 | Howe et al. |
| 4,824,073 A | 4/1989 | Zdeblick |
| 4,848,388 A | 7/1989 | Waldbusser |
| 4,864,824 A | 9/1989 | Gabriel et al. |
| 4,893,655 A | 1/1990 | Anderson |
| 4,896,728 A | 1/1990 | Wolff et al. |
| 4,943,032 A | 7/1990 | Zdeblick |
| 5,060,888 A | 10/1991 | Vezain et al. |
| 5,061,914 A | 10/1991 | Busch et al. |
| 5,069,419 A | 12/1991 | Jerman |
| 5,072,288 A | 12/1991 | MacDonald et al. |
| 5,114,504 A | 5/1992 | AbuJudom, II et al. |
| 5,116,252 A | 5/1992 | Hartman |
| 5,117,916 A | 6/1992 | Ohta et al. |
| 5,119,555 A | 6/1992 | Johnson |
| 5,129,753 A | 7/1992 | Wesley et al. |
| 5,160,233 A | 11/1992 | McKinnis |
| 5,190,546 A | 3/1993 | Jervis |
| 5,192,147 A | 3/1993 | McCloskey |
| 5,211,371 A | 5/1993 | Coffee |
| 5,218,998 A | 6/1993 | Bakken et al. |
| 5,245,738 A | 9/1993 | Johnson |
| 5,309,717 A | 5/1994 | Minch |
| 5,312,152 A | 5/1994 | Woebkenberg, Jr. et al. |
| 5,325,880 A | 7/1994 | Johnson et al. |
| 5,344,117 A | 9/1994 | Trah et al. |
| 5,364,046 A | 11/1994 | Dobbs et al. |
| 5,494,113 A | 2/1996 | Polan |
| 5,543,349 A | 8/1996 | Kurtz et al. |
| 5,605,543 A | 2/1997 | Swanson |
| 5,619,177 A | 4/1997 | Johnson et al. |
| 5,622,225 A | 4/1997 | Sundholm |
| 5,640,217 A * | 6/1997 | Hautcoeur et al. ............ 351/41 |
| 5,641,364 A | 6/1997 | Golberg et al. |
| 5,695,504 A | 12/1997 | Gifford, III et al. |
| 5,714,690 A | 2/1998 | Burns et al. |
| 5,722,989 A | 3/1998 | Fitch et al. |
| 5,771,742 A | 6/1998 | Bokaie et al. |
| 5,772,378 A | 6/1998 | Keto-Tokoi |
| 5,796,152 A | 8/1998 | Carr et al. |
| 5,819,749 A | 10/1998 | Lee et al. |
| 5,825,275 A | 10/1998 | Wuttig et al. |
| 5,837,394 A | 11/1998 | Schumm, Jr. |
| 5,840,199 A | 11/1998 | Warren |
| 5,850,837 A | 12/1998 | Shiroyama et al. |
| 5,867,302 A | 2/1999 | Fleming |
| 5,903,099 A | 5/1999 | Johnson et al. |
| 5,924,492 A | 7/1999 | Kikuchi et al. |
| 5,930,651 A | 7/1999 | Terasawa |
| 5,960,812 A | 10/1999 | Johnson |
| 6,072,617 A | 6/2000 | Henck |
| 6,073,700 A | 6/2000 | Tsuji et al. |
| 6,075,239 A | 6/2000 | Aksyuk et al. |
| 6,084,849 A | 7/2000 | Durig et al. |
| 6,101,164 A | 8/2000 | Kado et al. |
| 6,126,371 A | 10/2000 | McCloskey |
| 6,139,143 A * | 10/2000 | Brune et al. ................ 351/153 |
| 6,195,478 B1 | 2/2001 | Fouquet |
| 6,203,715 B1 | 3/2001 | Kim et al. |
| 6,229,640 B1 | 5/2001 | Zhang |
| 6,247,493 B1 | 6/2001 | Henderson |
| 6,277,133 B1 | 8/2001 | Kanesaka |
| 6,386,507 B2 | 5/2002 | Dhuler et al. |
| 6,406,605 B1 | 6/2002 | Moles |
| 6,407,478 B1 | 6/2002 | Wood et al. |
| 6,410,360 B1 | 6/2002 | Steenberge |
| 6,451,668 B1 | 9/2002 | Neumeier et al. |
| 6,454,913 B1 | 9/2002 | Rasmussen et al. |
| 6,470,108 B1 | 10/2002 | Johnson |
| 6,524,322 B1 | 2/2003 | Berreklouw |
| 6,533,905 B2 | 3/2003 | Johnson et al. |
| 6,537,310 B1 | 3/2003 | Palmaz et al. |
| 6,582,985 B2 | 6/2003 | Cabuz et al. |
| 6,592,724 B1 | 7/2003 | Rasmussen et al. |
| 6,605,111 B2 | 8/2003 | Bose et al. |
| 6,614,570 B2 | 9/2003 | Johnson et al. |
| 6,620,634 B2 | 9/2003 | Johnson et al. |
| 6,624,730 B2 | 9/2003 | Johnson et al. |
| 6,669,795 B2 | 12/2003 | Johnson et al. |
| 6,688,828 B1 | 2/2004 | Post |
| 6,729,599 B2 | 5/2004 | Johnson |
| 6,742,761 B2 | 6/2004 | Johnson et al. |
| 6,746,890 B2 | 6/2004 | Gupta et al. |
| 6,771,445 B1 | 8/2004 | Hamann et al. |
| 6,790,298 B2 | 9/2004 | Johnson et al. |
| 6,811,910 B2 | 11/2004 | Tsai et al. |
| 6,840,329 B2 | 1/2005 | Kikuchi et al. |
| 6,843,465 B1 | 1/2005 | Scott |
| 6,920,966 B2 | 7/2005 | Buchele et al. |
| 6,955,187 B1 | 10/2005 | Johnson |
| 7,040,323 B1 | 5/2006 | Menchaca et al. |
| 7,044,596 B2 * | 5/2006 | Park ........................ 351/103 |
| 7,084,726 B2 | 8/2006 | Gupta et al. |
| 2001/0023010 A1 | 9/2001 | Yamada et al. |
| 2002/0018325 A1 | 2/2002 | Nakatani et al. |
| 2003/0002994 A1 | 1/2003 | Johnson et al. |
| 2003/0170130 A1 | 9/2003 | Johnson |
| 2004/0200551 A1 | 10/2004 | Brhel et al. |
| 2004/0249399 A1 | 12/2004 | Cinquin et al. |
| 2006/0118210 A1 | 6/2006 | Johnson |
| 2006/0213522 A1 | 9/2006 | Menchaca et al. |
| 2007/0127740 A1 | 6/2007 | Johnson et al. |
| 2007/0246233 A1 | 10/2007 | Johnson |

FOREIGN PATENT DOCUMENTS

| | | |
|---|---|---|
| EP | 1122526 | 8/2001 |
| EP | 1238600 | 9/2002 |
| JP | 59179771 | 10/1984 |
| JP | 07090624 | 4/1995 |
| JP | 10173306 | 6/1998 |
| SU | 1434314 | 10/1988 |
| WO | WO98/53362 | 11/1998 |
| WO | WO00/04204 | 1/2000 |
| WO | WO03/052150 | 6/2003 |
| WO | WO2005/108635 | 11/2005 |

OTHER PUBLICATIONS

Johnson, David et al.; U.S. Appl. No. 10/972,745 entitled "Non-explosive releasable coupling device," filed Oct. 25, 2004.

Xiaogdang, Ma; U.S. Appl. No. 10/972,759 entitled "Magnetic data storage system," filed Oct. 25, 2004.

Johnson, David et al.; U.S. Appl. No. 11/006,501 entitled "Anastomosis device and method," filed Dec. 6, 2004.

Johnson, David et al.; U.S. Appl. No. 11/041,185 entitled "Single crystal shape memory alloy devices and methods," filed Jan. 24, 2005.

Johnson, David; U.S. Appl. No. 11/396,234 entitled "Tear-resistant thin film methods of fabrication," filed Mar. 31, 2006.

Johnson, David; U.S. Appl. No. 11/420,157 entitled "Shape memory allow thin film, method of fabrication, and articles of manufacture," filed May 24, 2006.

Johnson, David; U.S. Appl. No. 11/526,138 entitled "Constant load bolt," filed Sep. 22, 2006.

Johnson, David; U.S. Appl. No. 11/859,697 entitled "Constant load fastener," filed Sep. 21, 2007.

I. E. Viahhi; Robototechnic Constructions Based On CU-AL-NI Single Crystal Actuators; Proceedings of Second International Conference on Shape Memory and Superelastic Technologies; 1997; United States.

Pauling, Linus, College Chemistry, second edition, W.H. Freeman and Company, San Francisco, 1955, pp. 81-91.

Buchaillot L. et al., "Thin film of titanium/nickel shape memory alloy for multi-degree of freedom microactuators", Seisan Kenkyu, vol. 51, No. 8, 1999, pp. 22-23.

Johnson A. D. et al., "Application of shape memory alloys: advantages, disadvantages, and limitations", Micromachining and Microfabrication Process Technology VII, Oct. 22-4, 2001, San Francisco, CA, USA, vol. 4557, 2001, pp. 341-351.

Takabayashi S. et al., "Reversible shape memory alloy film fabricated by RF sputtering", Materials and Manufacturing Processes, vol. 13, No. 2, 1998, pp. 275-286.

Martynov, V., "TiNi thin films for microactuators and microdevices: sputter deposition and processing techniques", Thermec' 2003, Internat'l Conf. on Processing and Manufacturing of Advanced Materials, Jul. 7-11, 2003, Leganes, Madrid, Spain, Materials Science Forum, Jul. 7, 2003 vol. 426-432; pp. 3475-3480.

Johnson, David et al.; U.S. Appl. No. 11/948,852 entitled "Method of alloying reactive elemental components," filed Nov. 30, 2007.

Johnson, David et al.; U.S. Appl. No. 11/949,663 entitled "Hyperelastic shape setting devices and fabrication methods," filed Dec. 3, 2007.

* cited by examiner

EYEGLASS FRAME

CROSS-REFERENCE TO PRIOR APPLICATION

This application claims the benefit under 35 USC §119(e) of U.S. provisional application Ser. No. 60/678,921 filed May 9, 2005.

FIELD OF THE INVENTION

The present invention relates to frames for eyeglasses, and more particularly to eyeglass frames with improved flexures joining the bows with the foreframes.

BACKGROUND OF THE INVENTION

Frames to support eyeglasses on the face of the user probably developed soon after the first eyeglasses, at least several hundred years ago. Historically, they have been made of a large variety of materials, including bone, horn, metal, plastic etc. The making and marketing of eyeglasses is a worldwide trade involving hundreds of individual companies and totaling billions of dollars each year. The industry is stratified: certain companies make only components, others assemble components into frames, others are solely marketing. A very large component of customer satisfaction involves fashion. Eyeglass fashions change every few months.

An enhancement in satisfaction with the product can worth hundreds of millions of dollars per year. The introduction of prior art superelastic Nitinol eyeglass frames has led to growth of a highly competitive and litigious segment of the industry. Nitinol (also known as NiTi or TiNi) is an alloy of titanium nickel that undergoes an energetic crystalline phase change at near-ambient temperatures: these different phases have distinctly different mechanical characteristics giving rise to shape memory and superelasticity, which is the ability to recover more than 3-4 percent strain.

To date nearly all eyeglass frames have employed hinges to join the temple with the rim. Existing eyeglasses that do not have hinges and use ordinary material or superelastic nitinol are limited in the permitted flexure. These may suffer from stiffness, making them difficult to store in a compact space, and are subject to permanent distortion due to plastic deformation if elastic limit of the frame material is exceeded. To diminish this limitation, superelastic eyeglass frames and components have been known for more than a decade of years, and are a major selling item in eyeglass manufacturing and retail.

Superelastic SMA

Shape memory alloy materials (also termed SMA) are well known. One common SMA material is TiNi (also known as nitinol), which is an alloy of nearly equal atomic content of the elements Ti and Ni. Such an SMA material will undergo a crystalline phase transformation from martensite to austenite when heated through the material☐s phase change temperature. When below that temperature the material can be plastically deformed from a "memory shape" responsive to stress. When heated through the transformation temperature, it reverts to the memory shape while exerting considerable force.

In the prior art many different useful devices employing SMA have been developed and commercialized. The typical SMAs used in the prior art devices are of polycrystalline form. Polycrystalline SMA exhibits both: 1) shape memory recovery (when cycled through the material's transformation temperature) and 2) superelasticity. The term superelasticity as used herein applies to a polycrystal SMA material which, when above the transformation temperature (in the austenite crystalline phase), exhibits a strain recovery of several percent. This is in comparison to a strain recovery on the order of only about 0.5 percent for non-SMA metals and metal alloys. Polycrystalline alloys, including Nitinol, cannot achieve the maximum theoretical strain recovery because not all of the crystal grains are optimally aligned.

Superelasticity in a polycrystal SMA material results from stress-induced conversion from austenite to martensite as stress is increased beyond a critical level, and reversion from martensite to austenite as stress is reduced below a second (lower) critical level. These phenomena produce a pair of plateaus of constant stress in the plot of stress versus strain at a particular temperature. Single crystal superelasticity is characterized by an abrupt change in slope of the stress strain plot at a combination of stress, strain, and temperature characteristic of that particular alloy.

Hyperelastic SMA

Shape memory copper-aluminum based alloys grown as single crystals have been experimentally made in laboratories, typically in combination with about 5 percent Ni, Fe, Co, or Mn. The most common such CuAl-based alloy is CuAlNi, which is used throughout this description as the primary example; others are CuAlFe, CuAlCo, and CuAlMn. Single crystal SMA materials when stressed have the property of enabling a shape memory strain recovery much greater than polycrystalline SMA, and resulting shape recovery from about 9% to as great as 24% when above the phase change transition temperature. Because such strain recovery is so far beyond the maximum strain recovery of both convention polycrystal SMA materials and non-SMA metals and alloys, the strain recovery property of single crystal SMA will be referred to herein as "hyperelastic."

OBJECTS OF THE INVENTION

A general object of the present invention is to provide an improved eyeglass frame which is a more satisfactory consumer product.

It is another object of the invention to provide eyeglass frames in which components, such as the hinges, have greater flexibility than prior art eyeglass frames.

DESCRIPTION OF THE PREFERRED EMBODIMENTS

Many of the limitations in prior art eyeglasses using superelastic SMA (polycrystalline alloys) material are obviated in the present invention through the use of single crystal hyperelastic shape memory alloys which provide an improved material for making flexures enabling extreme distortions, i.e.

strain recovery from about 9% to as great as 24% when above the phase change transition temperature. One preferred hyperelastic SMA for use in the invention is single crystal CuAlNi.

One advantage of CuAlNi is its extended temperature range of hyperelasticity. Krumme U.S. Pat. No. 4,772,112 describes a method of making Nitinol superelastic over a temperature range from −20 to +40 deg. C. However, strain of these specially created superelastic materials is limited to about 3%, not enough to make a compact flexure strength to make a satisfactory substitute for a pin hinge.

Hyperelastic single crystal CuAlNi SMA provides an even greater temperature range, from cryogenic temperature to +200 deg. C., and a larger hyperelastic region, up to 9% or 10% and in certain instances as much as 20%.

Figure 1A:
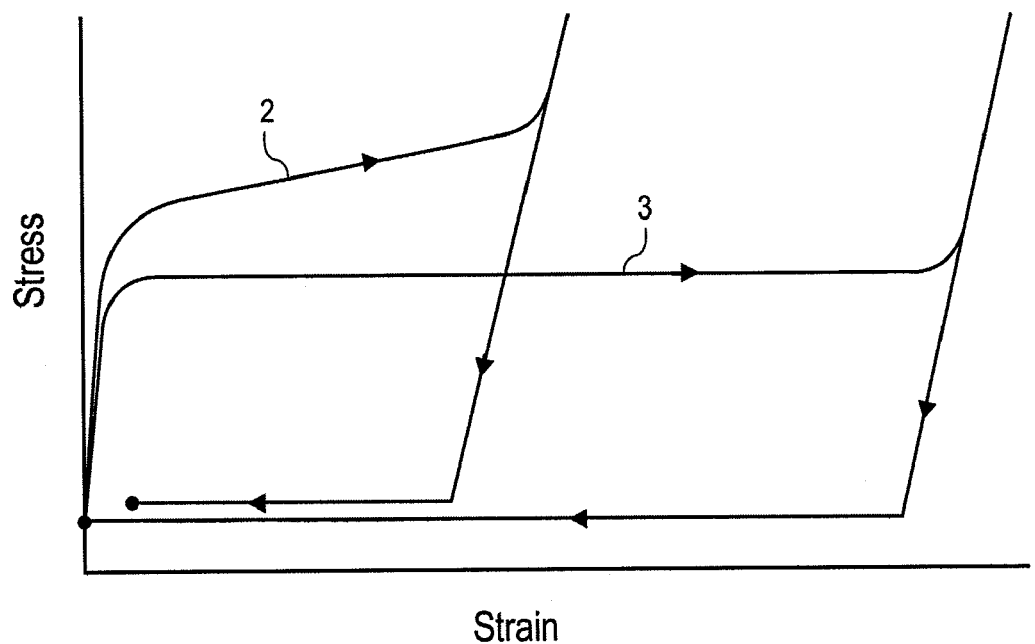
FIGS. 1A and 1B are diagrams showing stress/strain isotherms for SMA materials demonstrating hyperelasticity over a wide temperature range, and enhanced strain compared to Nitinol.

The stress-strain diagram of FIG. 1A shows curves 2 and 3 representing superelastic SMA. Both curves demonstrate the SMA's superelastic properties.

Figure 1B:
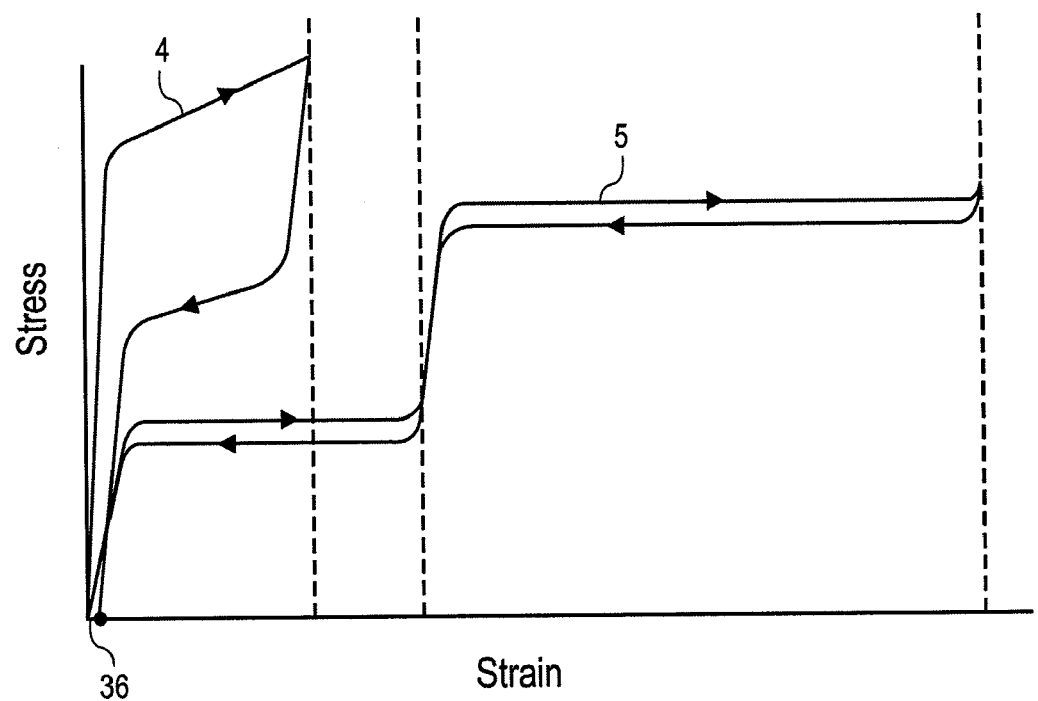

In comparison, the stress-strain diagram of FIG. 1B shows curves 4 and 5 representing hyperelastic SMA. The curves represent temperatures that differ by 90 deg. C., and both demonstrate the SMA's hyperelastic properties. In FIG. 1B the two stress-strain diagrams for hyperelastic SMA each showing a plateau up to 9% with a small hysteresis.

In the existing eyeglasses containing Nitinol, superelasticity is enhanced by cold work.

This requires significant pre-processing of the material. Enhanced superelasticity of CuAlNi is an intrinsic property of single crystal CuAlNi and is achieved without extra processing steps. The as-quenched single crystal provides recoverable strains that are larger than can be achieved in Nitinol under optimal conditions.

Hyperelastic single crystal CuAlNi is produced by the Stepanov method, described elsewhere. In this method, one or several crystals are pulled from melt, generally in vacuum. The environment must be very low oxygen content, less than 10e-5, to prevent oxidation of Al as it migrates to the surface. Particles of Al2O3 adhering to the surface of the meniscus as it solidifies initiates formation of multiple crystals. It is important to maintain the cooled such that the crystallization zone is independent of the die through which the melt is pulled so that crystallization takes place without being affected by the die. The region between the die and the crystallization zone is supported and contained by surface tension so that crystal growth is solely in the (100) direction. The mechanical properties of single crystal CuAlNi are not isotropic, and the direction that tolerates the greatest recoverable strain is in this preferred direction.

Superelasticity in single crystal CuAlNi is inherent in the material: it originates from the conversion of austenite (high temperature phase) to stress-induced martensite (low temperature phase) that takes place at constant stress. The material is strong enough, (or the conversion takes place at a small enough stress) that, without damage to the material, this conversion can take place in material that has a transformation temperature far below room temperature and reaches to high above room temperature.

Shape-setting in nitinol amounts to deforming, constraining, & annealing. One cannot do this with single crystal: it will degenerate. So a different method is employed. Material is deformed, constrained, rapidly heated and rapidly cooled so that precipitation does not occur.

Other methods are known for shape-setting CuAlNi alloys. For example the German patent WO03052150. These methods are limited to small deformations, less than 4%. Our method allows up to 9% deformation after shape-setting: the original crystal is not changed, but has a new shape.

There is no need to do the kind of sophisticated heat treatment and cold work required in TiNi. And the superelastic region is greater.

Figure 2:
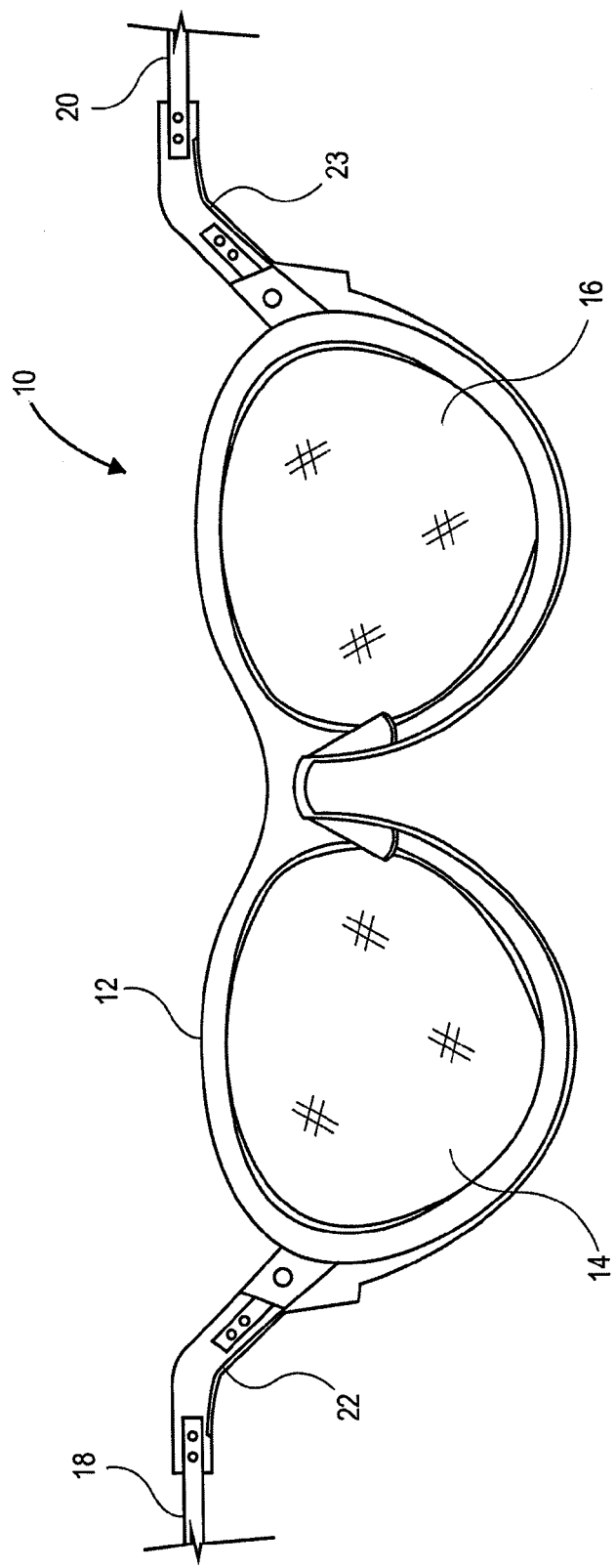
FIG. 2 is an isometric view of eyeglasses in accordance with one embodiment having separate hyperelastic hinge/flexures with the bows shown bent into outward positions.

FIG. 2 illustrates an embodiment providing eyeglass frame 10. The frame comprises a foreframe 12 for holding a pair of lenses 14, 16 and a pair of bows 18, 20. The bows are of sufficient length for passing alongside the user's temple and over the user's ear. The frame further comprises separate flexures 22, 23 which join together the bows with the foreframe. Each flexure is made of hyperelastic material.

Figure 3:
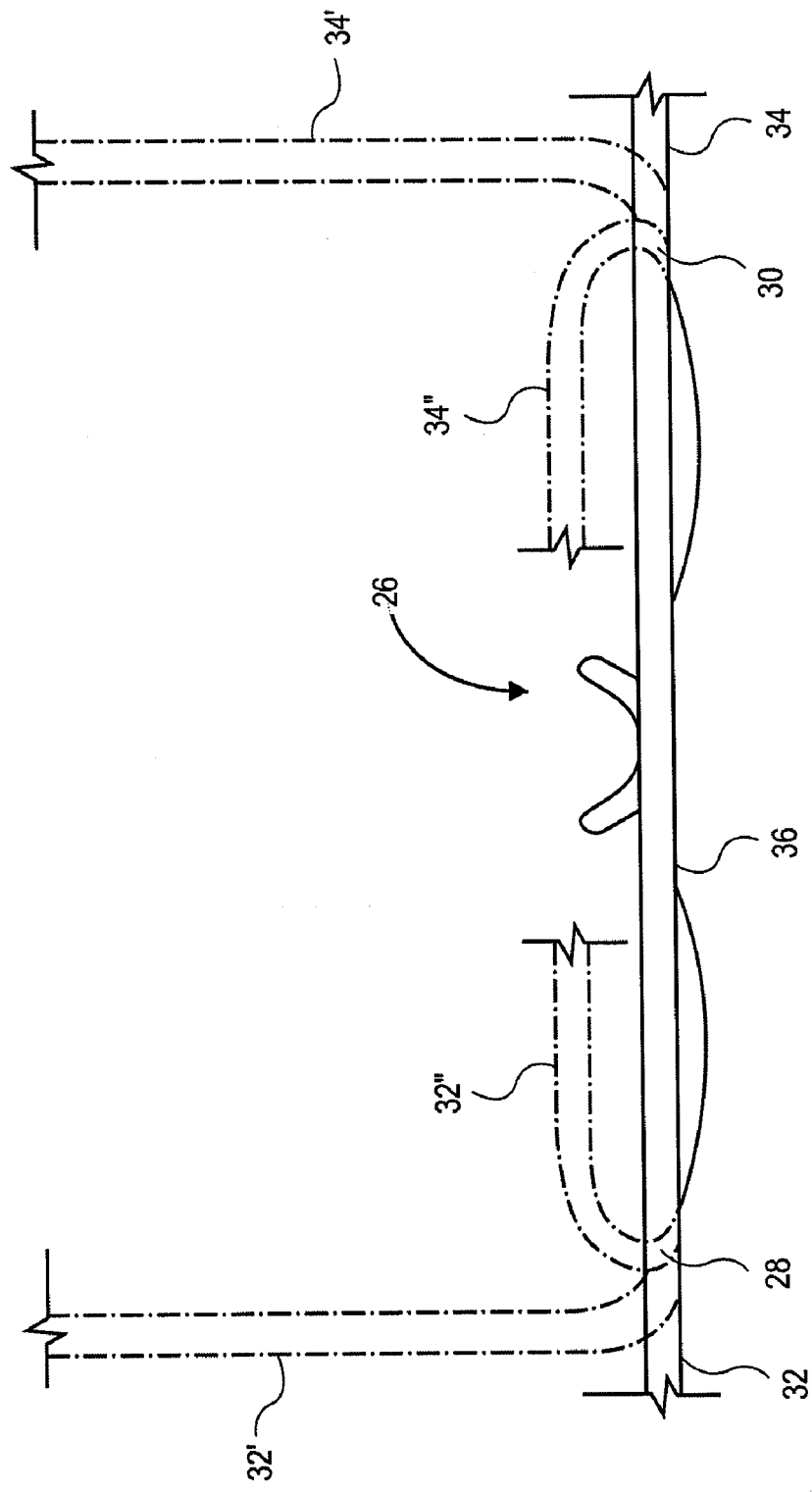
FIG. 3 is an isometric view of eyeglasses in accordance with another embodiment having hyperelastic hinge/flexures integral with the frame and with the bows shown bent into three different positions.

The embodiment of FIG. 3 provides an eyeglass frame 26 in which the flexures comprise portions 28, 30 of hyperelastic material and in which the flexures are integral with bow 32, 34 and foreframe 36 of which both are also formed of hyperelastic material. As used herein, the phrase "integral with the bow and foreframe" in relation to the flexure means that the bow, flexure and foreframe are uniformly joined as one piece of hyperelastic material and not as separate pieces.

In both embodiments the flexures, being made of hyperelastic SMA such as CuAlNi, enable the bows to be bent through 180 degrees without damage. Thus, in FIG. 3 the solid lines shown at 32, 34 depict the bows bent into the plane of the foreframe, broken lines 32', 34' depict the bows at right angles to the foreframe, and broken lines 32", 34" depict the bows bent inwardly inot the foreframe plane.

The flexure may be shaped to fit the configuration of the frame. It may be attached to the rim and to the temple piece by any convenient means. Methods include bolting, pinning, riveting, swaging, threading, bonding by means of adhesives, soldering, and welding. Some of these methods require special equipment and materials. In particular, ordinary fluxes do not clean the surface of CuAlNi. Brazing with TiCuSil or other flash bonding agents will remove the native oxide and enable suitable bonds with adequate strength.

Eyeglass products made with the hyperelastic material will be more durable and consequently more tolerant of errors in handling. It is also possible to incorporate features that protect the lens from breakage by providing a constant-force frame.

Method of Fabricating Flexures of the Invention

A flexure for use in the invention is fabricated by these steps: a rod or wire is drawn from a melted ingot of CuAlNi of nominal composition Cu(85)Al(11)Ni(4) (atomic percent) in a furnace with an inert atmosphere or vacuum. Pulling rates, compensation, temperatures. Boules up to 1 cm diameter have been made. Multiple wires may be pulled simultaneously from the same melted ingot.

The furnace is cooled. The rod or wire is removed from the furnace. The rod is heated in a resistance-heater oven up to nominally 950 deg. C. The rod is plunged into salt water to quench by rapid cooling and thereby preserve the alloy with copper, aluminum, and nickel dissolved in each other.

Alternatively, the rod or wire is heated while being constantly moved through a heat source, such as an induction heater, and quenched, for example with a salt-water spray, for rapid cooling.

The rod is centerless ground to a fixed consistent dimension. It is inspected to determine that it is single crystal. The rod is cut into slices by electron discharge machining (EDM). Abrasive machining is used for further shaping to size and configuration to produce a flexure.

The flexure may be altered in shape by a shape-setting process that includes deforming to form induced martensite, heating rapidly to release stress, and cooling rapidly to preserve the solution of copper-aluminum-nickel.

The thickness of the flexure is made such that it has adequate strength but in bending straight either inward or outward its maximum strain does not exceed 10%. A variety of shapes, cross-sections, lengths, widths, and thicknesses are possible to fit various styles of glasses.

Other variations are possible that may be desirable. The hyperelastic hinge flexure may be curved like a carpenterâ??s tape so that it snaps into position. Carbon fiber may be used to make the bridge and the temple pieces.

The invention claimed is:

1. A method of fabricating an eyeglass frame having hyperelastic properties, the method comprising the steps of:
   providing a single crystal of a shape memory material comprised of a CuAl-based alloy of metals,
   shape-setting the crystal into an eyeglass flexure shape,
   heating the shape to a temperature sufficient to dissolving the metals into a solution,
   quenching the shape by cooling at a rate which is sufficiently rapid to preserve the solution, and
   removing the native oxide from the surface of the CuAl-based alloy.

2. The method of claim 1, wherein the shape memory material comprises an alloy of Cu, Al, and Ni.

3. The method of claim 1, wherein the step of removing the native oxide comprises brazing with TiCuSil or other flash bonding agent.

4. The method of claim 1, further comprising attaching the flexure to an eyeglass rim and temple piece by surface bonding.

5. The method of claim 1, further wherein the step of providing a crystal of a shape memory material comprises providing a single-crystal CuAlNi material.

* * * * *

UNITED STATES PATENT AND TRADEMARK OFFICE
CERTIFICATE OF CORRECTION

| | | |
|---|---|---|
| PATENT NO. | : 7,441,888 B1 | Page 1 of 1 |
| APPLICATION NO. | : 11/415885 | |
| DATED | : October 28, 2008 | |
| INVENTOR(S) | : A. David Johnson | |

It is certified that error appears in the above-identified patent and that said Letters Patent is hereby corrected as shown below:

Column 1, line 3; insert:

--STATEMENT AS TO FEDERALLY SPONSORED RESEARCH
This invention was made with Government support under Contract No. W31P4Q-05-C-0158 awarded by DARPA. The Government has certain rights in the invention.--

Signed and Sealed this
Seventeenth Day of May, 2011

David J. Kappos
*Director of the United States Patent and Trademark Office*